United States Patent [19]

Kawamura et al.

[11] 4,413,508

[45] Nov. 8, 1983

[54] ADJUSTING SYSTEM FOR CRANK ANGLE SENSOR

[75] Inventors: Yoshihisa Kawamura; Seishi Yasuhara, both of Yokosuka, Japan

[73] Assignee: Nissan Motor Company, Ltd., Yokohama, Japan

[21] Appl. No.: 300,101

[22] Filed: Sep. 8, 1981

[30] Foreign Application Priority Data

Sep. 9, 1980 [JP] Japan ............................... 55-125160

[51] Int. Cl.³ ............................................ G01M 15/00

[52] U.S. Cl. .................................. 73/116; 73/119 A; 123/478; 123/612; 324/391

[58] Field of Search ............. 73/119 A, 116; 324/391; 123/478, 480, 612

[56] References Cited

U.S. PATENT DOCUMENTS

| | | | |
|---|---|---|---|
| 3,314,407 | 4/1967 | Schneider | 324/391 X |
| 3,573,609 | 4/1971 | Vaher | 324/391 |
| 4,109,616 | 8/1978 | Zechnall et al. | 123/478 |

*Primary Examiner*—Jerry W. Myracle
*Attorney, Agent, or Firm*—Schwartz, Jeffery, Schwaab, Mack, Blumenthal & Koch

[57] ABSTRACT

An adjusting system for crank angle sensor signal comprises a crank angle sensor, a timing detector and an adjusting unit including an output control device. The crank angle sensor is associated with an engine crankshaft and produces first and second signals. The first signal is indicative of a predetermined crankshaft position for each engine cylinder and the second signal is indicative of rotation of the engine crankshaft through a unit angle. These signals are used for controlling fuel injection timing or spark timing. The timing detector measures the difference between an actual value and a target value with respect to a desired timing, which timing is, for example, fuel injection timing, spark timing, or a predetermined crankshaft position for each engine cylinder. The output control device is provided at a safe place away from various engine rotational parts and is manually operable to change its output as a correction value. The adjusting unit is adapted to adjust the first signal in response to the output of the output control device to make the actual value coincide with the target value so that the first signal is electrically adjusted safely and efficiently without moving the crank angle sensor itself to attain optimal fuel injection timing or spark timing.

19 Claims, 5 Drawing Figures

ADJUSTING SYSTEM FOR CRANK ANGLE SENSOR

BACKGROUND OF THE INVENTION

1. Field of the Invention

The present invention relates to an adjusting system for a crank angle sensor for use in internal combustion engines such as gasoline engines and diesel engines and, more particularly, to a system wherein such an adjustment is performed electrically with safety and high efficiency without moving the crank angle sensor itself.

2. Description of the Prior Art

Recently, fuel injection timing or spark timing in diesel engines or gasoline engines has been electronically controlled at an optimum in accordance with various engine operating conditions. For this purpose, a crank angle should be accurately detected since the crank angle is the essential determining factor for control of fuel injection timing or spark timing.

Generally, the crank angle is detected in the way as shown in FIG. 1. An engine crankshaft 1 is fitted at one end with a disk plate 2 which is provided on its circumference with a number of unit angle teeth 3 spaced apart from each other at regular intervals, and three reference teeth 4 each corresponding to the compression top dead center of two of six cylinders. The number of reference teeth 4 is three for 6-cylinder internal combustion engines and two for 4-cylinder internal combustion engines since every cylinder has one compression top dead center for every two rotations of the engine crankshaft. The position of a crank angle sensor 5 including an electromagnetic pick-up is precisely adjustable in the circumferential direction of the disk plate 2. The crank angle sensor 5 is fitted to a holder 6 which is fixed to part of the engine body such as an engine cylinder block. The crank angle sensor 5 produces a reference-angle signal and a unit-angle signal. The reference-angle signal goes high in level in response to each reference tooth 4, that is, each time the engine crankshaft rotates through 120 degress. The unit-angle signal goes high in level in response to each unit tooth 3, that is, each time the engine crankshaft rotates through a unit angle, for example, one degree. The reference-angle signal and unit-angle signal are converted via a common wave-shaping circuit into a reference-angle pulse signal and a unit-angle pulse signal, respectively. These pulse signals are then fed to a control unit, such as a fuel-injection-timing control unit or a spark-timing control unit, which is not shown in FIG. 1.

In this structure, however, it is rather difficult to accurately place the crank angle sensor 5 in a desired position and thus to obtain a signal indicative of the correct top dead center for each cylinder or of the required timing for each cylinder which will be used as a standard to control fuel injection timing or spark timing. Such a mounting error or detection error can be corrected as follows: A timing light is actuated to flash in synchronism with each pulse of the reference angle pulse signal from the wave shaping circuit. The light flashes are directed onto the engine crankshaft pulley and timing marks formed on an engine cylinder block to function as a stroboscope. If each of three top dead center marks formed on the crankshaft pulley does not coincide with a certain target value among the timing marks formed on the engine cylinder block, it means that there is a detection error or a mounting error of the crank angle sensor corresponding to the angle between the top dead center mark on the pulley and the target mark on the engine cylinder block. In this case, the mounting position of the crank angle sensor is manually adjusted until the top dead center mark on the pulley coincides with the target mark on the cylinder block.

However, such a mounting position adjustment of the crank angle sensor itself is quite dangerous, and thus entails quite a low operation efficiency, since there are a number of engine rotational parts in the vicinity of the crank angle sensor, such as an alternator, a compressor, an oil-hydraulic pump, a cooling fan, and driving belts thereof.

SUMMARY OF THE INVENTION

In view of the above problems, it is the primary object of the present invention to provide a system for adjusting a crank angle sensor signal for use in internal combustion engines such as gasoline engines or diesel engines, wherein such an adjustment is performed electrically, safely and efficiently without moving the crank angle sensor itself.

According to the present invention, there is provided a system for adjusting a crank angle sensor signal. The system comprises a crank angle sensor, a timing detector and an adjusting unit including an output control device. The crank angle sensor is associated with an engine crankshaft and produces first and second signals. The first signal is indicative of a predetermined crankshaft position for each engine cylinder and the second signal is indicative of rotation of the engine crankshaft through a unit angle. These signals are used for controlling fuel injection timing or spark timing. The timing detector measures the difference between an actual value and a target value with respect to a desired timing, which timing is, for example, fuel injection timing, spark timing, or a predetermined crankshaft position for each cylinder. The output control device is provided at a safe place away from various engine rotational parts and is manually operable to change its output as a correction value. The adjusting unit is adapted to adjust the first signal in response to the output of the output control device to make the actual value coincide with the target value so that the first signal is electrically corrected safely and efficiently without moving the crank angle sensor itself to attain optimal fuel injection timing or spark timing.

BRIEF DESCRIPTION OF THE DRAWINGS

Other objects, features and advantages of the present invention will be apparent from the following description, taken in conjunction with the accompanying drawings, which are given by way of example only, and are not intended to be limitative of the present invention. In the drawings.

DETAILED DESCRIPTION OF THE PREFERRED EMBODIMENT

Figure 1:
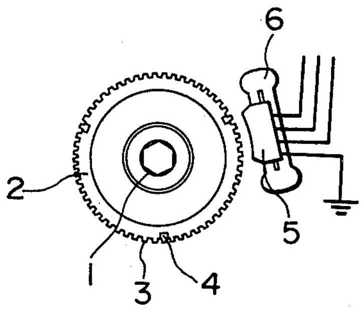
FIG. 1 is a schematic view showing a conventional mounting structure of a crank angle sensor.
Figure 2:
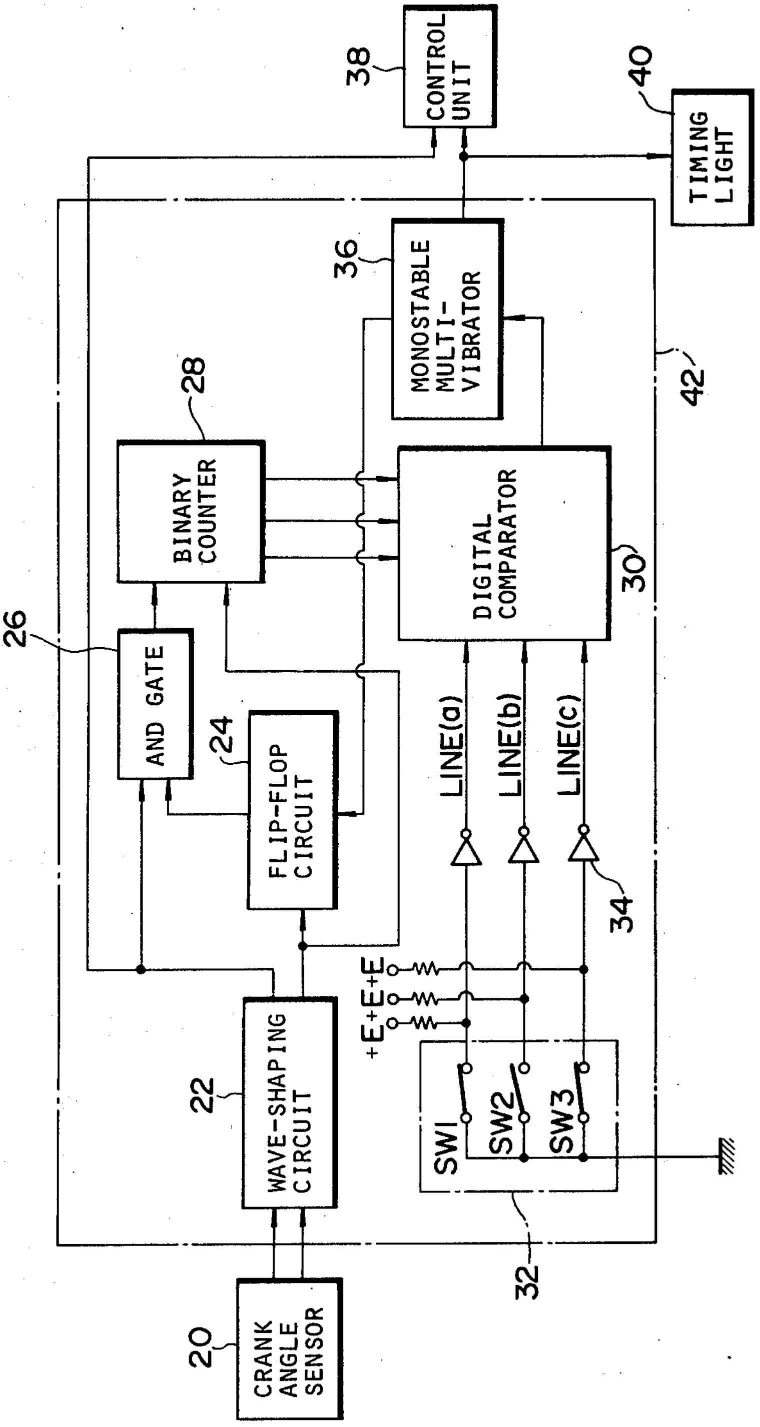
FIG. 2 is a block diagram showing a correcting system of the first embodiment according to the present invention.
Figure 3:
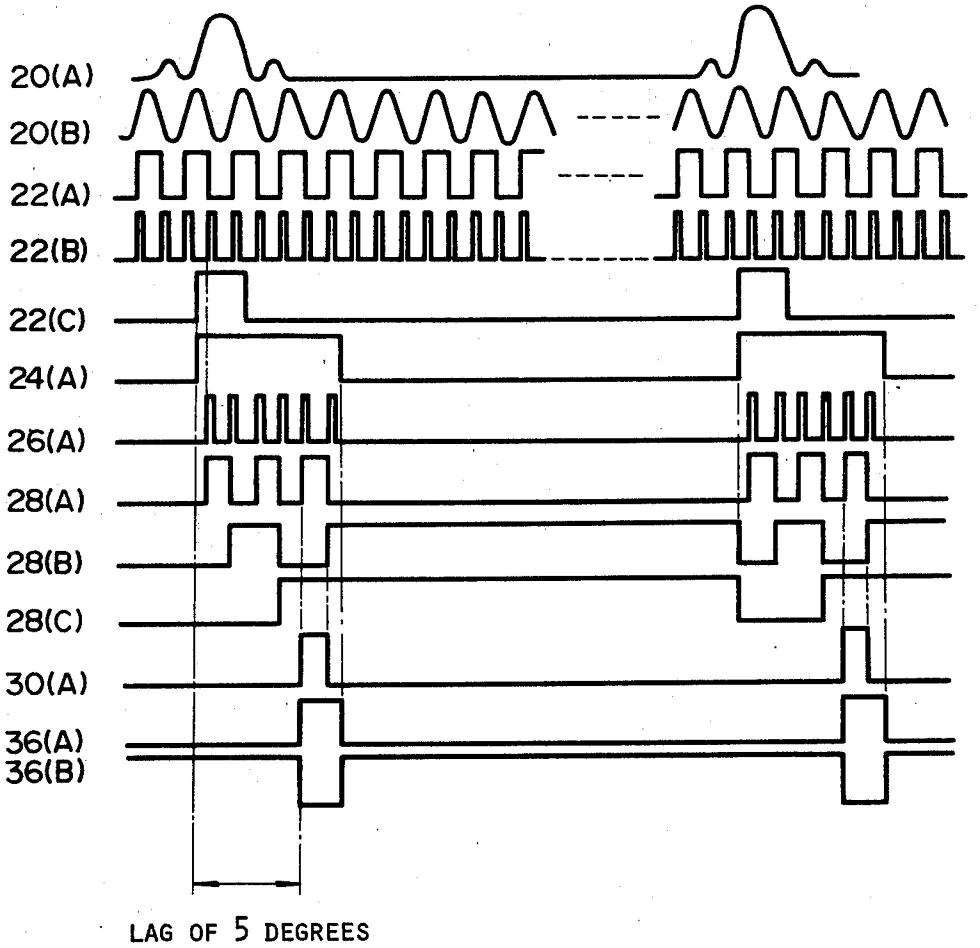
FIG. 3 is a time chart showing a plurality of wave forms representing the outputs of various elements in the circuit of FIG. 2.

Referring to FIG. 2, there is illustrated a first embodiment of the present invention. A crank angle sensor 20 is associated with an engine crankshaft, not shown, in the same way as in the prior art of FIG. 1 and produces a reference-angle signal 20(A) and a unit-angle signal 20(B) as shown in FIG. 3. The reference-angle signal 20(A) goes high in level after a predetermined number of degrees of rotation of the engine crankshaft. For example, the reference-angle signal 20(A) may become high in level each time the engine crankshaft rotates through 120 degrees for 6-cylinder internal combustion engines and through 180 degrees for 4-cylinder internal combustion engines. The unit angle signal 20(B) goes high in level for every two degrees of rotation of the engine crankshaft in this embodiment. The unit angle signal 20(B) may also be set to become high in level for every degree of rotation of the engine crankshaft.

The reference-angle signal 20(A) and the unit-angle signal 20(B) are fed to a wave-shaping circuit 22. The wave-shaping circuit 22 shapes the signal 20(A) into a reference pulse signal 22(C) as its output. The wave-shaping circuit 22 also shapes the unit-angle signal 20(B) first into a two-degree pulse signal 22(A) and then into a one-degree pulse signal 22(B) as its output. As clearly seen in wave forms 22(A) and 22(B) of FIG. 3, the one-degree pulse signal 22(B) goes high in level in response to the rising and falling edges of each pulse of the two-degree pulse signal 22(A).

A flip-flop 24 is supplied with the reference pulse signal 22(C) from the wave-shaping circuit 22 and generates a high output synchronously with the leading edge of its pulse as seen in waveform 24(A) of FIG. 3. The output 24(A) is held high until the flip-flop 24 is reset in response to the output of a monostable multivibrator 36, which will be described later.

An AND gate 26 receives as inputs the output 24(A) of the flip-flop 24 and the one-degree pulse signal 22(B) and produces a high output only when the output 24(A) and the signal 22(B) are both high in level as seen in waveform 26(A) of FIG. 3.

The output 26(A) of the AND gate 26 is inputted into a binary counter 28 which is also supplied with the reference pulse signal 22(C) from the wave-shaping circuit 22. The binary counter 28 starts to count pulses of the signal 26(A) in synchronism with the leading edge of the pulse of the reference pulse signal 22(C) applied thereto and provides three outputs 28(A), 28(B), and 28(C) to a digital comparator 30. Specifically, the output 28(A) changes its level in response to the rising edge of each pulse of the signal 26(A), the output 28(B) changes its level in response to the falling edge of each pulse of the signal 28(A) and the output 28(C) changes its level in response to the falling edge of the pulse of the signal 28(B).

These three outputs 28(A), 28(B), and 28(C) are inputted into the digital comparator 30 to be compared with inputs from a digital switch 32.

The digital switch 32 provides a high or low output to the digital comparator 30 for each of three input lines (a), (b) and (c). Since each output of the digital switch 32 is fed to the digital comparator 30 through an inverter 34, if, for example, a switch ($SW_1$) is in the ON-state as in FIG. 2, the input from the line (a) to the digital comparator is high in level. The digital switch 32 is adapted to vary its output value by changing the position of each of the switches ($SW_1$, $SW_2$, and $SW_3$) from ON to OFF or OFF to ON. In FIG. 2, the switch ($SW_1$) corresponds to the first place, the switch ($SW_2$) to the second place, and the switch ($SW_3$) to the third place in a binary word, i.e. the output value of the digital switch 32 is set at 101 in binary notation and at 5 in decimal.

In the digital comparator 30, the inputs 28(A), 28(B) and 28(C) from the binary counter 28 are respectively compared with the inputs from the digital switch 32 for each line. Specifically, the input 28(A) is compared with the input from the line(a), the input 28(B) is compared with the input from the line(b) and the input 28(C) is compared with the input from the line(c). The digital comparator 30 provides a high output during a period when each input from the binary counter 28 is the same in level as the corresponding input from the digital switch 32. Therefore, in this embodiment, the output 30(A) of the digital comparator is held high only for a period when the inputs 28(A) and 28(C) are high and the input 28(B) is low, as seen in FIG. 3.

This output 30(A) is inputted into the monostable multivibrator 36 which produces a one-shot pulse in synchronism with the input signal 30(A) as seen in waveform 36(A) of FIG. 3. As described before, the flip-flop 24 is reset in response to the inverted output 36(B) of the monostable multivibrator 36. Specifically, the flip-flop circuit 24 is reset to provide a low output to the AND gate 26 in response to the rising edge of the pulse of the signal 36(B). The output of the flip-flop is held low until the next pulse of the signal 22(C) is inputted thereto.

The signal 36(A) is delayed by 5 degrees in comparison with the reference angle pulse signal 22(C) as seen in FIG. 3. This lag of 5 degrees corresponds to the current output value of the digital switch 32, which means that the output value of the digital switch is a correction value to the reference-angle pulse signal 22(C). As clear from FIG. 3, the higher the output value of the digital switch 32 is set, the larger the pulse phase lag between the signals 22(C) and 36(A) becomes.

The signal 36(A) is then fed into a control unit, such as a fuel-injection-timing control unit or a spark timing control unit in diesel engines or gasoline engines so as to be utilized as a standard to control such timing.

Now the operation of this embodiment will be described hereinbelow.

A timing light 40 is actuated to flash in synchronism with each pulse of the signal 36(A). This light is directed onto an engine crankshaft pulley and the timing marks formed on an engine cylinder block to function as a stroboscope. If each of three top dead center marks formed on the crankshaft pulley does not coincide with a certain target value among the timing marks formed on the engine cylinder block, it means that there is a detection error or a mounting error of the crank angle sensor 20 corresponding to a value or an angle between the top dead center mark on the pulley and the target mark on the cylinder block. In this case, the phase of the pulse signal 36(A) can be adjusted by changing the output value of the digital switch 32 manually to reconcile the top dead center mark with the target mark, with the result that detection error of the crank angle sensor 20 is corrected without moving the crank angle sensor itself. When the top dead center mark coincides with the target mark, the output value of the digital switch 32 is fixed.

The phase-adjusting circuit 42 constituted by, as seen in FIG. 2, the above-described various elements is provided in a safe place away from various engine rotational parts such as at the rocker cover so that the above-described correction can be made easily, safely, and efficiently.

Figure 4:
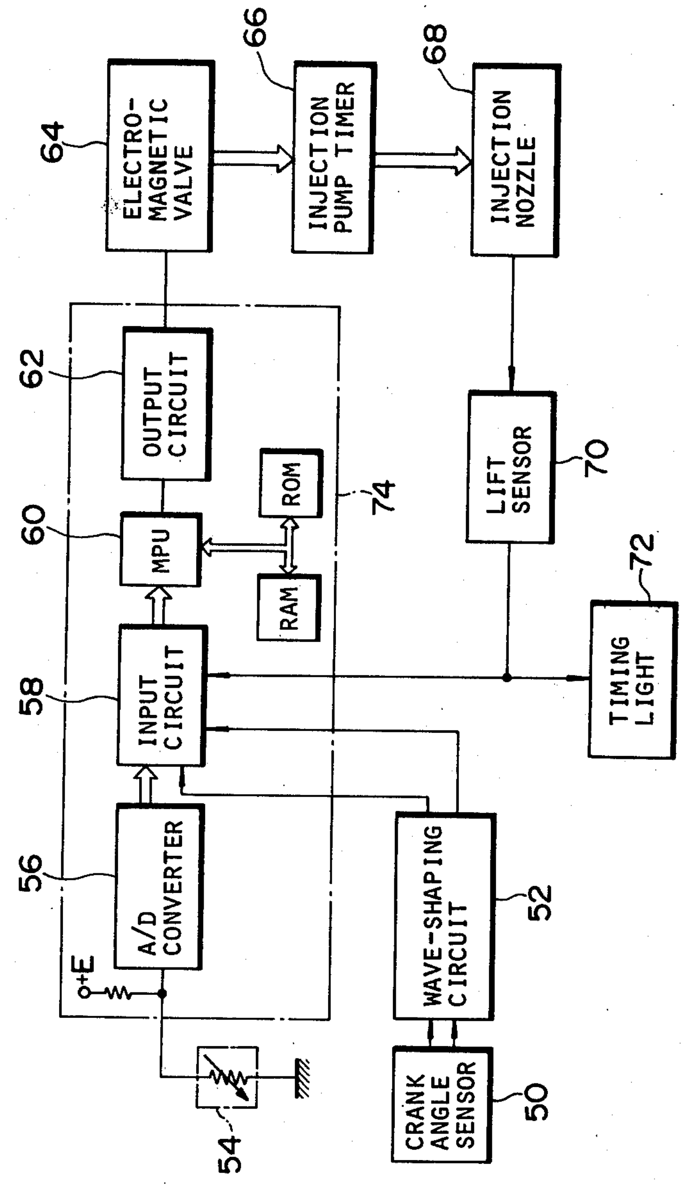
FIG. 4 is a block diagram showing a correction system of the second embodiment according to the present invention.

Now referring to FIG. 4, there is illustrated a second embodiment of the present invention, wherein fuel injection timing is directly adjusted to the target value with the result that detection error of the crank angle sensor is subsequently overcome.

According to the present embodiment, a crank angle sensor 50 is associated with an engine crankshaft for providing a reference-angle signal and a unit-angle signal in the same manner as in the first embodiment. These outputs of the crank angle sensor 50 are fed to a wave-shaping circuit 52 to be converted into pulse signals repectively in the same manner as in the first embodiment. These pulse signals are then inputted into a digital computer including an input circuit 58, a micro-processor-unit (MPU) 60, a read-only memory (ROM), a random-access memory (RAM) and an output circuit 62. The digital computer is also inputted with various engine operating conditions from various sensors, not shown, and with an output of a variable resistor 54 through an A/D converter 56. The variable resistor 54 is adapted to vary its output by changing its resistance value. The digital computer processes its inputs applied thereto, selects optimal fuel injection timing from the ROM where a number of optimal fuel-injection-timing values are previously stored in connection with various engine operating conditions, and outputs an injection drive pulse signal from the output circuit 62, in a per se well-known way. The drive pulse signal from the output circuit 62 is fed to an injection-timing control electromagnetic valve 64 to control it. This valve is opened or closed in response to this drive pulse signal to control the amount of fuel flowing therethrough and to control the pressure difference across a timer piston in the timer 66 of a fuel injection pump. The movement of this piston determines fuel injection timing from an injection nozzle 68. This injection timing is detected by a lift sensor 70 and is fed back to the digital computer.

A timing light 72 is actuated to flash in response to the lift signal from the lift sensor 70, which is indicative of the actual injection timing. So, as in the first embodiment, by detecting the difference between the top dead center mark on the crankshaft pulley and the target mark on the engine cylinder block, i.e. the difference between the actual fuel-injection-timing and the target fuel-injection-timing, detection error of the crank angle sensor is measured. This detection error is corrected by changing the output of the variable resistor 54 manually. Specifically, the output of the variable resistor is fed to the digital computer as a correction value to compensate for the difference between the actual and target timing values.

It is to be noted that this correction is performed during fixed engine operation, such as engine idling, so that the target fuel-injection-timing is considered to be constant during such a correction being performed and the actual fuel-injection-timing is variable only with respect to the output of the variable resistor. And when the top dead center mark on the crankshaft pulley coincides with the target value, the output value of the variable resistor is fixed as in the first embodiment.

In this embodiment, the variable resistor 54 is mounted in a safe place, such as an engine body etc., away from various engine rotational parts and the control circuit 74 comprising the digital computer and the A/D converter 56 is preferably provided at a place away from the engine in consideration of ignition noises etc.

Figure 5:
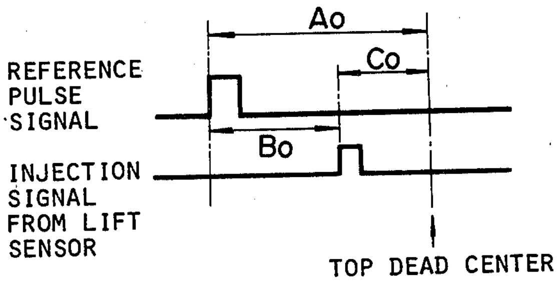
FIG. 5 is a time chart of some outputs of the second embodiment of FIG. 4.

For better understanding of the second embodiment, there is further provided FIG. 5, which shows only one explanatory example. In FIG. 5, $A_0$ is an output cycle of the variable resistor 54 used as a correction value to compensate for detection error of the crank angle sensor 50 between the correct top dead center and the detected top dead center of a single cylinder, $B_0$ is a phase difference between the detected top dead center and the actual fuel injection timing, and $C_0$ is an actual fuel injection advance angle. If the actual fuel injection timing is made to coincide with the target timing by utilizing the timing light 72, the output of the variable resistor will subsequently and automatically compensate for detecting error made by the crank angle sensor between the detected top dead center and the correct top dead center.

Though the second embodiment has been described in connection with the diesel engine, the present embodiment is also applicable to gasoline engines, such as a spark-timing control system. In the spark-timing control system, the timing light may be actuated to flash in synchronism with spark ignition.

While the present invention has been described in conjunction with specific embodiments thereof, it is evident that many alternatives, modifications, and variations will be apparent to those skilled in the art. Accordingly, it is intended to embrace all alternatives, modifications, and variations that fall within the spirit and scope of the appended claims.

What is claimed is:

1. An adjusting system for internal combustion engines comprising:

first means associated with an engine crankshaft for producing first and second pulse signals, said first signal being indicative of a predetermined crankshaft position for each engine cylinder and said second signal being indicative of rotation of the engine crankshaft through a predetermined unit angle;

second means applied with said first and second signals from said first means for adjusting said first signal to provide a third pulse signal; and third means for measuring the difference between an actual value and a target value with respect to a desired timing, said actual value of the desired timing being variable corresponding to a change in a pulse phase of said third signal;

said adjustment of the first signal being done to eliminate said difference between the actual and target values.

2. An adjusting system for internal combustion engines as set forth in claim 1, wherein said second means comprises:

fourth means being manually operable for outputting a correction value to compensate for said difference between said actual and target values; and fifth means, being supplied with said first and second signals from the first means and said correction value from said fourth means, for adjusting said first signal in response to said correction value to provide said third signal.

3. An adjusting system for internal combustion engines as set forth in claim 1, wherein said second means comprising:

a flip-flop for providing a high output in response to a pulse of the first signal from the first means applied thereto;

an AND gate, receiving as inputs the second pulse signal from the first means and the output of the flip-flop, for providing a pulse only when its inputs are both high in level;

a binary counter, starting to count the pulse applied from the AND gate in synchronism with the rising edge of the pulse of the first signal from the first means, for providing first, second, and third binary outputs, said first output changing its level each time the output of the AND gate goes high in level, the second output changing its level each time the first output goes low in level and the third output changing its level each time the second output goes low in level;

a digital switch, being manually operable, for producing first, second, and third binary outputs, which form a binary word as a correction value to compensate for said difference between the actual and target values;

a digital comparator receiving the three outputs of the binary counter and the three outputs of the digital switch, for comparing the first output of the binary counter with the first output of the digital switch, the second output of the binary counter with the second output of the digital switch and the third output of the binary counter with the third output of the digital switch, respectively, said digital switch providing a high output when each output of the binary counter is the same in level as the corresponding output of the digital switch; and a monostable multivibrator for providing a pulse in response to the high input from the digital comparator;

said flip-flop being reset to generate a low output in response to the trailing edge of the pulse applied from the monostable multivibrator.

4. An adjusting system for internal combustion engines as set forth in claim 3, wherein said third means is directly supplied with said third signal from said second means to measure said difference by detecting a pulse phase of said third signal, said actual value of the desired timing being in synchronism with each pulse of said third signal.

5. An adjusting system for internal combustion engines as set forth in claim 4, wherein said desired timing is the predetermined crankshaft position for each engine cylinder.

6. An adjusting system for internal combustion engines as set forth in claim 2, wherein said fifth means is a digital computer which is further supplied with various inputs for determining the optimal fuel injection timing at that time and said adjustment of the first signal is performed during fixed engine operation.

7. An adjusting system for internal combustion engines as set forth in claim 6, wherein said fourth means is a variable resistor.

8. An adjusting system for internal combustion engines as set forth in any one of the claims 3, 4, 6 and 7, wherein said predetermined crankshaft position is the compression top dead center for each engine cylinder.

9. An adjusting system for internal combustion engines as set forth in claim 6 or 7, wherein said desired timing is fuel injection timing and said difference is measured by detecting an occurrence when fuel is injected into each engine cylinder, said actual value of the desired timing being in synchronism with said occurrence.

10. An adjusting system for an internal combustion engine having a crankshaft, said adjusting means comprising:

a crank angle sensor associated with said crankshaft for producing a first pulse signal indicative of a predetermined crankshaft position;

means responsive to said first pulse signal for producing a second pulse signal having a controlled phase relation with respect to said first pulse signal;

means associated with said second pulse signal producing means for adjusting the phase relation of said second pulse signal with respect to said first pulse signal to vary the timing of said second pulse signal; and means responsive to said second pulse signal for controlling the timing of an engine operation;

whereas the timing of said engine operation may be controllably adjusted to a target value while the timing of said first pulse signal remains constant.

11. An adjusting system as set forth in claim 10 further comprising means responsive to said second pulse signal for comparing the timing of said second pulse signal to a desired target value.

12. An adjusting system as set forth in claim 11 wherein said comparing means comprises a strobe light energized synchronously with said second pulse signal.

13. An adjusting system as set forth in claim 10 wherein said phase relation adjusting means comprises means for outputting a correction signal having a desired value to said second pulse signal producing means, and means for adjusting the phase relation of said second pulse signal in response to said correction signal.

14. An adjusting system as set forth in claim 13 wherein said correction signal outputting means is manually adjustable to vary the value of said correction signal.

15. An adjusting system as set forth in claim 14 wherein said correction signal outputting means comprises a binary switch.

16. An adjusting system as set forth in claim 14 wherein said correction signal outputting means comprises a variable resistor.

17. An adjusting system as set forth in claim 10 wherein the timing of said engine operation is synchronized with the timing of said second pulse signal.

18. An adjusting system as set forth in claim 10 wherein said engine operation is spark ignition.

19. An adjusting system as set forth in claim 10 wherein said engine operation is fuel injection.

* * * * *